Jan. 29, 1963  F. A. LENNON ET AL  3,075,793
PACKED WEDGE TYPE COUPLING HAVING POSITIONING MEANS
Filed June 3, 1959

INVENTOR.
EDWARD J. CATOR
BY FRED A. LENNON

ATTORNEYS

United States Patent Office 3,075,793
Patented Jan. 29, 1963

3,075,793
PACKED WEDGE TYPE COUPLING HAVING
POSITIONING MEANS
Fred A. Lennon, Pepper Pike, and Edward J. Cator, Cleveland, Ohio, assignors to Crawford Fitting Company, Cleveland, Ohio, a corporation of Ohio
Filed June 3, 1959, Ser. No. 817,924
1 Claim. (Cl. 285—342)

The present invention relates to tube coupling or fitting means and more particularly it relates to a fitting assembly for a tube, the tube being held in a pressure fluid tight constricting grip by the assembly.

One of the principal objects of the invention is the provision of a tube fitting having a multiple number of tube gripping parts, each of the parts being adapted to be constricted and swaged radially inwardly in timed sequence for gripping a tube. One of the advantages of the invent is that the parts are first seated so that the seals are properly effected and then the parts are successively swaged radially inwardly for constricting the tube so that the constricting action of one tube gripping part of the fitting does not interfere with the sealing action or the constricting action of the other tube gripping part.

Still another object of the invention is the provision of a tube fitting which can be easily assembled with low torque wrenching requirements, the fitting including timing or positioning means to effect a principal seal against pressure fluid leakage and then constrict and tightly grip the tube for preventing separation of the tube and the fitting.

Another object is to provide a fitting of the type referred to in the preceding object, in which the gripping action serves to further tighten the seal between the fitting and the tube. As pointed out above, one of the important advantages of first positioning the fitting parts for effecting the principal seal and then tightly gripping the tube is that the gripping action will not interfere with the positioning and seating of the complementary principal seal surfaces by retarding the relative longitudinal or axial advancement thereof during assembly. Usually the gripping of the tube in prior art devices results in interference with the positioning and seating of the complementary sealing surfaces, and as a consequence, the fitting must be highly torqued to obtain the proper seal. In some instances, the seal cannot even be properly effected with very high torque wrenching.

Therefore, a still further object is the provision of a multipart tube fitting especially adapted to be assembled with a tube by means of threading which requires only low torque wrenching. This is accomplished in a novel manner which includes a deformable annular ridge or flange designed to assure that a pressure fluid tight principal seal is effected before the fitting is constricted and tightly engages the tube periphery. The gripping action prevents the separation of the tube and the fitting and further assures a pressure fluid tight connection. In other tube fittings the sealing and gripping actions take place simultaneously rather than in timed sequence, at two axially spaced points with the result that high torque wrenching is required due to interference from the gripping action at one point on the tube while the seal is being effected.

Another object of the invention is to provide an economically manufacturable fitting for a tube of relatively small diameter that can be assembled with low torque wrenching or threading, will hold and remain leak-free at high fluid pressures and/or can be more easily made than prior art structures.

Another object of the invention is the provision of a tube fitting of the kind referred to which comprises a minimum number of parts each part being easily formed, especially by machining.

Yet another object is the provision of a new fitting comprising a ferrule adapted to coact with a tube and with other components of the fitting to effect a fluid tight seal and to tightly grip the tube for preventing its separation from the fitting after a principal seal has been effected.

A still further object of the invention is the provision of tube coupling means for a tube and comprising a tubular coupling body, tapered ferrule means having a deformable outer annular ridge and a coupling nut wherein the tapered ferrule means interposed between the tubular coupling body and the coupling nut is adapted, when subjected to deforming axial pressure against its ridge, to be positioned in sealing engagement with the tubular coupling body and the coupling nut and then to constrict and clinchingly grip the tube by means of a swaging action upon the wall of the tube.

Another object of the invention is the provision of tube coupling means, as set forth in the preceding object, wherein the ferrule means comprise a tapered front sleeve and a tapered back sleeve arranged in tandem relationship, the tapered back sleeve having a deformable ridge adapted to be axially engaged by the nut.

Another object is the provision of tubular coupling means having the two tapered sleeves set forth in the preceding objects wherein the back sleeve, which has the deformable annular ridge, is made of a material possessing a higher elastic limit than the front sleeve.

The invention further resides in certain novel features of construction, and combinations and arrangements of parts, and further objects and advantages thereof will be apparent to those skilled in the art to which it pertains from the following description of the present preferred embodiment thereof described with reference to the accompanying drawing in which similar reference characters represent corresponding parts throughout the several views, and in which.

Figure 1:
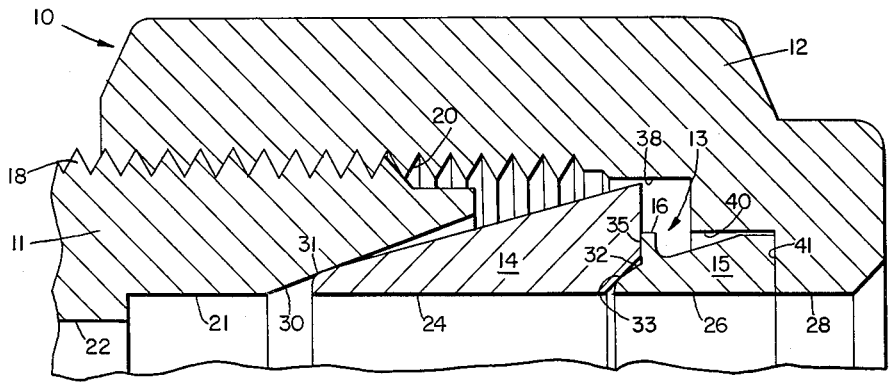
FIG. 1 is a fragmentary longitudinal sectional view of a tube fitting embodying the invention.

It will be understood that the invention is not limited to the details of construction and arrangement of parts shown in the drawing and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to FIG. 1, the invention is shown embodied in high pressure tube fitting or coupling means, indicated generally by the reference number 10, for the purpose of illustrating a preferred embodiment of the invention. The fitting means 10 comprise a tubular coupling body 11, a coupling nut 12, and coaxial ferrule or sleeve means, indicated generally by the reference number 13. The ferrule means 13 comprise a tapered front sleeve 14 and a tapered back sleeve 15 having timing and positioning means 16, the sleeves 13, 14 being arranged in tandem between the body 11 and the nut 12. The fitting 10 is adapted to be connected to a terminal end of a tube 17, shown in FIG. 2.

More particularly, the coupling body 11 has external helical threads 18 mating with internal helical threads 20 of the nut 12 which has been threaded onto the body 11. A counterbore 21, formed in one end of the body 11, is of sufficiently greater diameter than its central opening 22 so as to telescope over the concentric terminal end of the tube 17. The front sleeve 14, the rear sleeve 15, and the nut 12, respectively have central openings 24, 26 and 28 of substantially the same diameter for being slidably disposed over the tube 17.

The wall of the counterbore 21 flares radially and axially outwardly so as to form a frusto-conically shaped mouth 30 adapted to be sealingly engaged by a leading annular edge portion 31 of the tapered front sleeve 14. The front sleeve 14 is externally tapered radially and axially outwardly from the apicad portion 31, but the slope of the taper is less than that of the mouth 30 of the body 11 and thereby permits a principal seal to be effected where the leading edge portion 31 abuts the tapered wall of the mouth 30.

A tapered or frusto-conical wall or orifice surface 32 at a trailing or rear end of the front sleeve 14 is adapted to be sealingly engaged by a leading annular edge portion 33 of the rear sleeve 15 when the nut 12 is tightly threaded onto the body 11.

Preferably, at the same time that the leading edge 33 of the rear sleeve 15 engages the tapered wall 32, a radially extending annular face 35 of the timing and positioning means 16 is juxtaposed with a radially extending rear end face 36 of the front sleeve 14, it being understood that the face 35 may also be adapted to engage the face 36 immediately before the leading edge 33 engages the wall 32. However, it is least desirable that the edge 33 engage the wall 32 before the face 35 engages the face 36. The reason for this is that the timing and positioning means 16 are adapted to push the front sleeve 14 into the mouth 30 and into engagement with the body 11 for effecting a principal fluid-tight seal therewith.

The nut 12 is of internally stepped configuration as a result of two concentric counterbores 38, 40. As the nut 12 is threaded onto the body 11, a radially extending annular bottom face 41 of the innermost counterbore 40 abuts with the radially extending annular rear or butt end of the rear sleeve 15 for axially forcing the tandem arranged sleeves 14, 15 against the body 11. As a result, the ridgelike timing and positioning means 16 effectively position the ferrule means 13 into sealing position. Consequently, as the nut 12 and the body 11 are threaded together, the principal seal formed between the edge 31 and the wall of mouth 30 and the secondary seal formed between the edge 33 and the tapered wall 32 are effected before the contraction and timed sequential clinching action of the leading edges 31, 33 respectively occurs.

Figure 2:
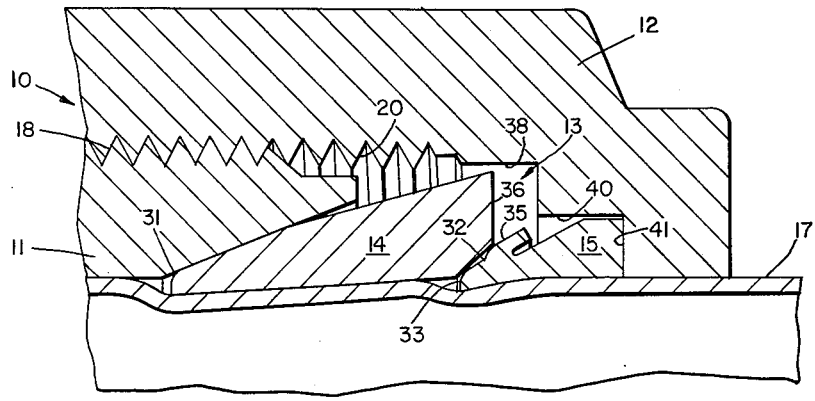
FIG. 2 is a view similar to FIG. 1, but showing the tube fitting embodying the invention in assembly with a length of tube.

Then, as the nut 12 and body 11 are continued to be threaded together, the deformable ridge means 16 begins to yield in a rearward direction and the leading edges 31, 33 of the sleeves 14, 15, respectively, are swaged inwardly for constricting and gripping the tube 17, FIG. 2. The leading edges 31, 33 are respectively swaged inwardly due to the taper of the wall of mouth 30 and the tapered wall 32. The edge 33 cannot be swaged inwardly until the ridge means 16 are deformed as in FIG. 2.

The amount of force required to deform and thereby deflect the ridge means 16 rearwardly depends upon the stiffness of the material and the physical dimensions thereof. Preferably the rear sleeve 15 has a higher elastic limit than the front sleeve 14.

Figure 3:
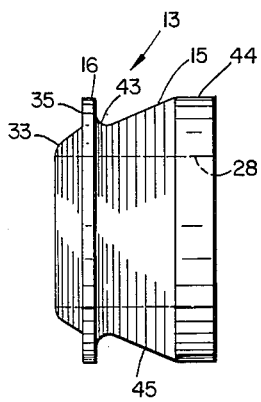
FIG. 3 is an enlarged detailed elevational view of a novel part of the tube fitting of FIGS. 1 and 2.

A preferred configuration of the rear sleeve 15 is shown in FIG. 3. The deformable positioning means 16 comprise a radially outwardly extending annular flange having a front positioning face 35 adapted to mate with and abut the face 36 of the front sleeve 14. The leading annular and externally tapered edge 33 preferably curves inwardly towards the cylindrical central opening 28 so that no sharp annular edge is formed to catch onto the tapered wall 32 and interfere with the positioning of the sleeve 15.

As will be observed from FIG. 1 of the drawing, the front positioning face 35, the orifice surface 32 and the forward end portion of the rear sleeve 15 together define an annular space adjacent the front positioning face of the deformable flange 16. It is believed that this space lends itself to proper swaging action of the rear sleeve on take up of the coupling nut 12, in that it facilitates movement of the deformable flange from the position shown in FIG. 1 to that shown in FIG. 2.

The rear face of the flange 16 is undercut and is a determining factor as to how much axial force is necessary to deform and bend the ridge means back to the right as shown in FIG. 2. The undercut leaves a smooth annular fillet 43 having an arcuate contour.

The outside diameter of the flange 16 is substantially the same as an outer cylindrical wall portion 44 near the butt end of the sleeve 15. A radially inwardly extending tapered portion 45 necks down from the portion 44 to the fillet 43.

When the deformable ridge means 16 is deflected backwardly, FIG. 2, the rear face thereof is disposed substantially parallel to the tapered neck portion 45.

It is understood that should the timing and positioning means be either wholly or partially sheared off, or fractured or ruptured during the assembly of the fitting 10, that such occurrence is well within the concept and spirit of the present invention since this can be controlled by the application of ordinary practices and techniques.

From the foregoing it is apparent that when the parts of the fitting are properly positioned before the constricting and clinching action on the tube 17 occurs that reduced torque is necessary to effect the coupling.

It is the intention to hereby cover not only the above mentioned preferred construction shown, but all adaptations, modifications, and uses thereof which come within the practice of those skilled in the art to which the invention relates, and the scope of the appended claims.

What is claimed is:

A device for positioning a member on a cylindrical member, and including a tubular coupling body to support the cylindrical member, the internal surface of said body being cylindrical through a portion of its length and terminating in an outwardly flared mouth having a maximum diameter greater than that of the cylindrical portion, a front sleeve of a size slidably to fit about the cylindrical member and having essentially the form of a cylindrically hollow right circular conical frustum, the tapered external surface thereof being formed on an angle somewhat less than that of said mouth, and terminating at its forward end portion with a curved apicad portion, the apicad portion of the front sleeve being seated in said mouth adjacent the smaller diameter end of said mouth in initial nonpressure contact therewith, said front sleeve having a chamfered orifice surface extending inwardly from its base and formed on an angle greater than that of said mouth, a rear sleeve of a size slidably to fit about said cylindrical member and having a tapered external surface opposed to said chamfered orifice surface, said tapered surface of the rear sleeve being formed on an angle generally corresponding to that of said chamfered orifice surface and terminating at its forward end with a curved apicad portion seated against said orifice surface adjacent the smaller diameter end of such surface, a radially extending deformable flange member provided on the outer surface of the rear sleeve near the apicad portion thereof and providing front and rear faces, said front face being initially seated against the rearward end of said front sleeve, said chamfered orifice surface, the front face of the deformable flange member and the forward end portion of the rear sleeve together defining, prior to take up of the device, an annular space adjacent the base of the forward face of said deformable flange, said deformable flange member being undercut at the base of the rear face thereof, said rear sleeve having a rearwardly facing wall transverse the axis of the cylindrical member, a coupling nut threadedly engaged with the coupling body and slidably fitted about said cylindrical member, said coupling nut being formed with a shoulder abutting the rearwardly facing wall of the rear sleeve for driving said front sleeve and said rear sleeve axially of said cylindrical member and forwardly and downwardly along said mouth and said orifice surface, respectively, thereby to constrict said sleeves into gripping engagement with said cylindrical member, the sleeves being of sufficient strength and hardness thereupon to deform said cylindrical member, said flange, at the completion of take up, being rearwardly bent by said orifice surface into a position along the tapered external surface of said rear sleeve, the resistance of said flange to deformation being so gauged with respect to that of the front sleeve and of said cylindrical member as to be so bent only after substantial constriction of said front sleeve has taken place, thereby to prevent untimely constriction of said rear sleeve.

References Cited in the file of this patent

UNITED STATES PATENTS

| | | |
|---|---|---|
| 2,182,811 | Kocher | Dec. 12, 1939 |
| 2,417,536 | Wurzburger | Mar. 18, 1947 |
| 2,484,815 | Crawford | Oct. 18, 1949 |
| 2,544,108 | Richardson | Mar. 6, 1951 |